United States Patent [19]

Cunningham

[11] E Re. 29,422

[45] Reissued Oct. 4, 1977

[54] INDEX TABS

[75] Inventor: Walter F. Cunningham, Des Plaines, Ill.

[73] Assignee: Superior Tabbies, Incorporated, Elk Grove Village, Ill.

[21] Appl. No.: 675,817

[22] Filed: Apr. 12, 1976

Related U.S. Patent Documents

Reissue of:

[64] Patent No.: 3,805,426
Issued: Apr. 23, 1974
Appl. No.: 339,984
Filed: Mar. 12, 1973

[51] Int. Cl.[2] ..... A44C 3/00

[52] U.S. Cl. ..... 40/2 R

[58] Field of Search ..... 40/2 R, 23 A, 125 A, 40/359, 360

[56] References Cited

U.S. PATENT DOCUMENTS

| | | | |
|---|---|---|---|
| 2,893,144 | 7/1959 | Cunningham | 40/23 A |
| 3,001,306 | 9/1961 | Wilkinson | 40/23 A |
| 3,191,767 | 6/1965 | Glowiak | 40/23 A |
| 3,540,140 | 11/1970 | Tourre | 40/23 A |
| 3,691,662 | 9/1972 | Cunningham | 40/23 A |

*Primary Examiner*—Louis G. Mancene
*Assistant Examiner*—Wenceslao J. Contreras
*Attorney, Agent, or Firm*—McCaleb, Lucas & Brugman

[57] ABSTRACT

Set of ten strips of 10 two-digit color coded numerical indexing tabs, each strip comprising a backing of release paper and an overlying strip of transparent film having a coating of pressure-sensitive adhesive on its under surface mounted on the backing and cut transversely to devine ten individually separable tabs, the tabs of each strip being color coded by [reverse] printing the same first digit on each with ink of the same color and leaving a blank space on each tab directly adjacent the first digit, the overlying strip having a write-on upper surface coterminous with such blank spaces to enable selective application in each blank space of any desired digit for display with the adjacent first digit; only five different colors of ink being employed, each with one of the first five strips respectively displaying 0 through 4 as the first digit, and the second five strips respectively displaying 5 through 9 as the first digit, each with one of those five colors and with the printing being extended laterally of the tabs to outline the blank spaces; the longitudinal margins of each overlying strip comprising skirt portions on each tab applicable in use to opposed surfaces of a sheet to be indexed, means defining a fold line laterally across each tab to facilitate such mounting thereof, and the [reverse] printing extending on both sides of the fold line to enable three dimensional identification of the tabs as mounted in use.

8 Claims, 5 Drawing Figures

INDEX TABS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to indexing tabs, and more particularly to those designed for terminal digit filing and for random filing within proper hundreds.

2. Description of the Prior Art

Tab indexing systems have used pre-printed two-digit tabs in sets of ten strips of 10 tabs each comprising one hundred different tabs from 00 through 99 for terminal digit filing and color coded with one of 10 different colors for each strip or using only five colors, one for each of the first five strips having 00 through 49 printed in a split face, and the same five colors respectively for the second five strips having 50 through 99 printed in a solid reverse face.

In a single office or other location where terminal digit filing is employed in consecutive numerical sequence, all 100 of the tabs of such a set will be used without any waste. However, in any skip number installation or in central computer number allotment where, although the numbers follow out in consecutive numerical sequence, they go to various locations or branch offices so that they are not received and cannot be filed in consecutive sequence in each location, it has been found that a large number of the tabs in such a set cannot be used. This constitutes a very serious waste.

SUMMARY OF THE INVENTION

The present invention eliminates from 50 to 70 percent of such waste in any location where it is desired to employ terminal digit filing and constant or frequent repeats of the same terminal digits are received from a central computer or skip numbers are encountered. It comprises strips of two-digit color coded numerical indexing tabs with each strip having a backing or release paper and an overlying strip of transparent film with a coating of pressure-sensitive adhesive on its under surface mounted on the backing strip and cut transversely to define ten individually separable tabs color coded by reverse printing the same first digit on each with ink of the same color and leaving a blank space on each tab directly adjacent that first digit, and the overlying upper strip having a write-on upper surface coterminous with the blank spaces to enable selective application in each blank space during use, as by pen, pencil or typing, of any desired digit for display with the adjacent said first digit. Thus, a complete set may comprise ten such strips, each with a different pre-printed first digit and constructed to enable application thereto during use of any desired second digit, whereby one hundred indexing tabs are provided as in the prior pre-printed two-digit sets, but all of the tabs of the present set may be used in any terminal digit filing system to eliminate the waste described above as encountered in multiple locations employing a central computer and any skip number installation.

DESCRIPTION OF THE PREFERRED EMBODIMENT

Figure 1:
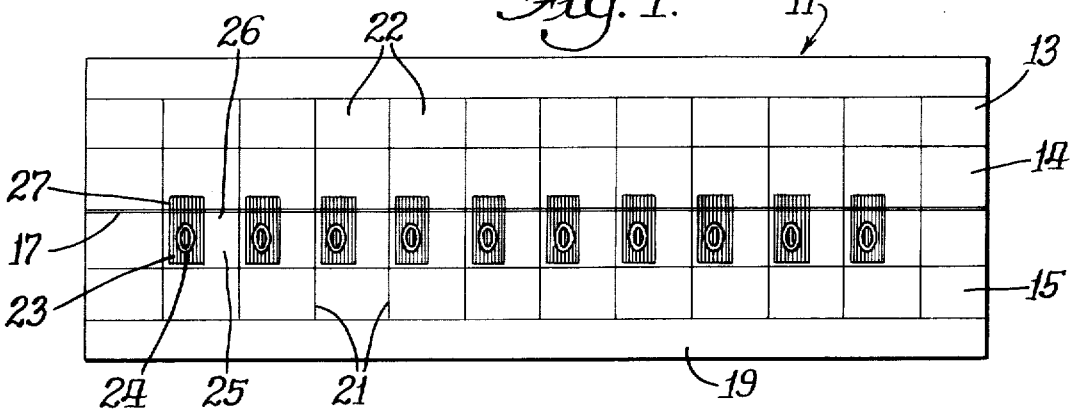
FIG. 1 is a plan view of the first of a set of ten strips of indexing tabs embodying the invention.
Figure 2:
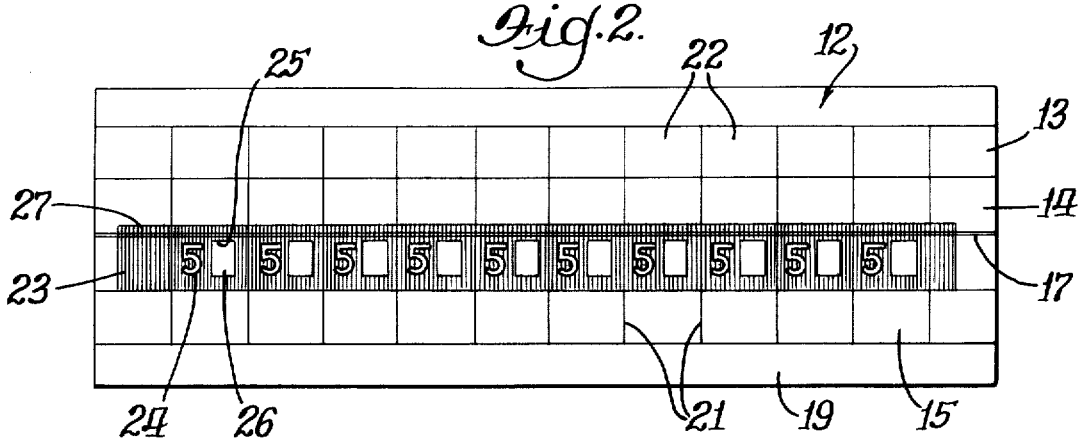
FIG. 2 is a plan view of the sixth strip of the set which includes that of FIG. 1.
Figure 3:
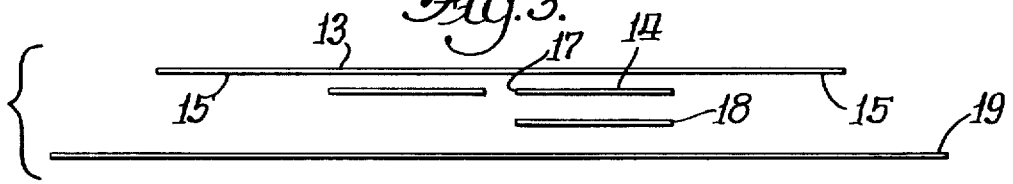
FIG. 3 is an exploded end view, as seen from the right of FIG. 1, showing the lateral relationship of the different laminates of the strip on an enlarged scale.

A set of two-digit color coded indexing tabs for terminal digit filing embodying this invention is made up of 10 strips, two of which are illustrated in FIGS. 1 and 2 and generally designated, respectively, by reference numerals 11 and 12. Each of these strips 11 and 12 is shown in FIG. 3 as comprising an overlying strip or top laminate of transparent film 13 having a coating of pressure-sensitive adhesive on its lower surface. An intermediate or legend laminate 14 of printable paper or film, preferably opaque, and with pressure-sensitive adhesive on its lower surface is adhered to the lower surface of the top laminate 13. This [legned] *legend* laminate 14 is narrower than the overlying strip 13 so that the edge portions or longitudinal margins of the latter extend beyond it to provide adhesive-coated skirt portions 15 for attaching the index tabs to the opposed surfaces of a receiving sheet, such as the file cards 16 of FIG. 4.

To facilitate folding in a manner to be described, it is preferred that the legend laminate be slit longitudinally at 17 during forming of the strips 11, 12, as described in U.S. Letters Patent No. 3,070,482, to present this intermediate laminate as two parallel strips, although a score line may be employed instead of the slit 17 to define a fold line. A filler laminate 18 of paper or film is adhered to the lower surface of the legend laminate 14 to serve as a stiffener, having its outer edge disposed adjacent one outer edge of the legend laminate 14 to expose the one skirt portion 15 and its inner edge adjacent the longitudinal center line of the legend laminate or the slit 17 to define a fold line which will be effective even if the legend laminate is not slit as at 17.

The laminates 13, 14 and 18 are adhered together and mounted in well known manner on a carrier 19 comprising a backing strip of suitable release paper wider than, and extending laterally beyond, the widest or top laminate 13. Die cutting along lateral lines 21 (FIGS. 1 and 2) through all of the laminates down to the carrier 19 then defines 10 tabs 22 which may be removed individually from the strip 11 or 12 for use by mounting on a desired receiving sheet. These tabs, as so far described, are generally similar to the prior pre-printed two-digit tabs previously referred to and those of U.S. Letters Patent Nos. 2,893,144; 3,348,324 and 3,691,662.

However, in this invention the tabs 22 are color coded by reverse printing in colored ink 23, preferably on the upper surface of the legend laminate 14, to outline a first digit 24 and leave a blank space 25 on each tab directly adjacent that first digit, and the overlying strip 13 is provided with a write-on upper surface 26 coterminous with the blank spaces 25. This write-on upper surface 26 is a matte finish on the film, or any finish which readily will receive and retain pen, pencil or typed markings. The upper surface 26 also may be a reverse ink printed or screened surface on a single ply of transparent film.

Of the first five strips 11 of a set of 10 strips, each is split printed with a different colored ink 23 and to display a different first digit 24 on all of its tabs 22, from "0" through "4." Thus, as shown in FIG. 1, the first split strip 11 of the set displays "0" as the first digit 24 on each tab 22.

The second five strips 12 of a set of ten strips also are printed in the same colors, each in a different colored ink 23 and to display a different first digit 24 on all of its tabs 22, from "5" through "9". Thus, as shown in FIG. 2, the sixth strip of the set, which is the first strip 12, displays "5" as the first digit 24 on each tab 22. To differentiate between the strips 11 and 12 and their tabs 22 having the same color coding, such as the first strip 11 displaying "0" and the sixth of the set or first strip 12 displaying "5" of FIGS. 1 and 2, the reverse printing with the colored ink 23 on each of the second five strips 12 is solid or extended laterally of the tabs 22 to outline the blank spaces 25.

In order to enable three directional identification of the indexing tabs 22 as mounted in use, the reverse printing with the colored ink 23 on each strip 11 and 12 is extended laterally thereof over the fold line, as defined by the slit 17 for example, sufficiently to present a marginal portion 27 (FIGS. 1, 2 and 5) that will be displayed on the fold line from above and on the reverse side of the receiving sheet after the tab is mounted thereon. If the slit 17 is not employed, it is preferable that flexible ink be used when the printing is extended over the fold line. As will be appreciated from FIGS. 1 and 2, such three directional display will be wider on the split tabs 11 than on the solid tabs 12, so that the desired top and rear identification can be made from the combination of the color and the length of the colored printing transversely of the tabs 22 (longitudinally of the strips 11 and 12).

Figure 4:
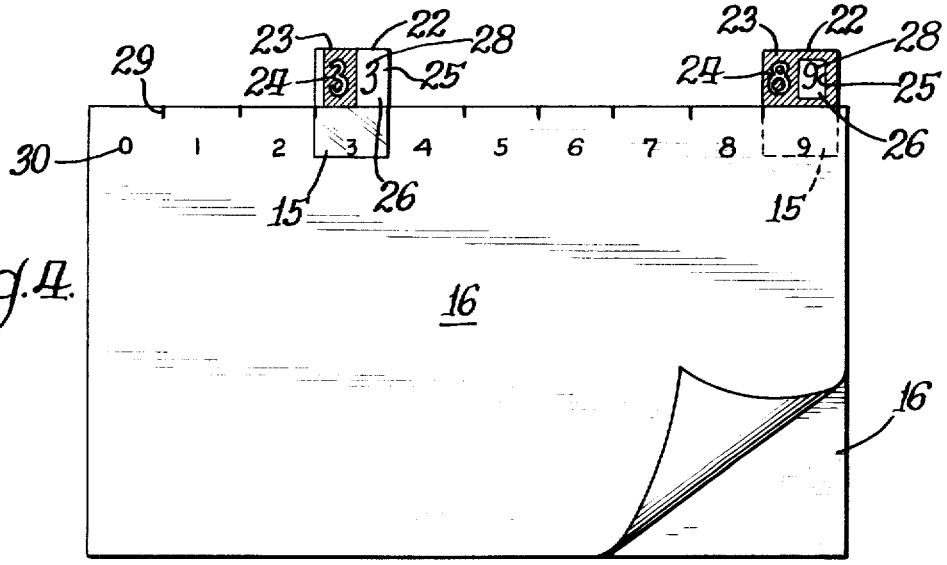
FIG. 4 is a front elevational view of two file cards with indexing tabs of this invention attached.

To illustrate use of a set of strips 11, 12 of this invention, it is assumed that terminal digit filing of cards 16 containing desired information is to be effected under "33" and "89". The user applies with pen, pencil or typewriter to the write-on surface 26 of the blank space 25 on one of the tabs 22 of the fourth strip 11 of the set having "3" as the pre-printed first digit 24, a second or added digit 28 (FIG. 4), in this instance "3". That tab 22 with the terminal digits 24, 28 of "33" then is removed from its release paper strip 19 and applied to the edge of the appropriate file card 16 as shown in FIG. 4. This application may be accomplished most easily by placing the outer edge of the filler laminate 18 of the inscribed tab 22 along and against the upper edge of the card 16, with the exposed under surface of the adjacent skirt portion 15 facing the reverse side of the card, and pressing that skirt portion into contact with the card. The free end of the tab 22 then is folded over the upper or originally inner edge of the filler laminate 18 and the other skirt portion 15 pressed against and adhered to the obverse side of the card. The same procedure then is followed for the card to be filed under the terminal digits "89" by inscribing "9" as a second digit 28 on one of the tabs 22 of the ninth strip or fourth strip 12 of the set having "8" as the pre-printed first digit 24, and applying that tab to the proper card 16, which is shown in FIG. 4 as being completed and filed behind the first card 16 that has its tab 22 displaying "33".

The position or location of any tab 22 on its file card 16 laterally of the card is determined by the second or terminal digit 28, there being ten possible proper positions, from that for "0" at the left end to that for "9" at right end. As shown in FIG. 4, such tab positions are identified by indicia in the form of lines 29 and numerals 30 inscribed along the upper marginal portion of the file cards 16. Thus, the tab 22 displaying "33" is mounted in the "3" or fourth position, and that bearing "89" in the "9" or tenth such position. Therefore, in a resulting group or stack of one hundred cards 16 individually so identified from "00" through "99," there will be ten cards with their tabs 22 in each lateral position and, regardless of the order in which they are filed or stacked, the user readily may pick out the card with any desired terminal digits merely by looking down the line of the position of the second digit 28 and identifying the tab therein which also has the desired first digit 24 by its color and the lateral length of the colored ink thereon.

Figure 5:
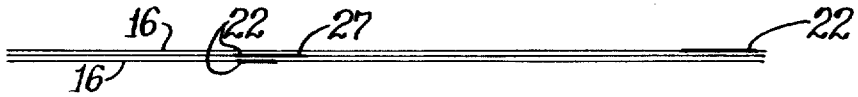
FIG. 5 is a top view of three file cards to illustrate the three dimensional identification effected.

These distinguishing features are three directional in that they may be recognized from the front or rear of the file cards as well as the top, as shown in FIG. 5, wherein the lowermost tab 22 displays "33," the one next behind it displays "83," and the third one at the right shows "89."These "33" and "89" cards are the same as the two illustrated in FIG. 4.

As noted, the color coding employs only five different colors for reverse printing or screening the first or penultimate digits 24 as follows:

| Split tabs 11 | Color | Solid tabs 12 |
|---|---|---|
| 0 | Red | 5 |
| 1 | Green | 6 |
| 2 | Blue | 7 |
| 3 | Brown | 8 |
| 4 | Black | 9 |

Thus, as shown in FIG. 4, the "3" split tab 22 and the "8" solid tab 22 both use the color brown, while the split strip 11 of FIG. 1 and the solid strip 12 of FIG. 2 both employ the color red.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

I claim:

1. A strip of 10 two-digit color coded numerical indexing tabs, comprising a backing strip of release paper, an overlying strip of transparent film having a coating of pressure-sensitive adhesive on its under surface mounted on said backing strip and cut transversely to define ten individually separable tabs, said tabs being color coded by reverse printing the same first digit on each with ink of the same color and leaving a blank space on each tab directly adjacent said first digit, and said overlying strip having a write-on upper surface coterminous with said blank spaces to enable selective application in each sad blank space during use of any desired digit for display with the adjacent said first digit.

2. A strip of tabs according to claim 1, wherein the reverse printing of said first digit is extended longitudinally of said strip to outline said blank spaces on said tabs in lateral relationship thereon relative to their associated said first digit.

3. A strip of tabs according to claim 1, wherein the longitudinal margins of said overlying strip comprise skirt portions on each said tab applicable in use to opposed surfaces of a sheet to be indexed, means defining a fold line laterally across each said tab to facilitate such mounting thereof, and said reverse printing extending on both sides of said fold line to enable three dimensional identification of said tabs as mounted in use.

4. A set of ten strips of 10 two-digit color coded numerical indexing tabs with different said strips coded with different colors, each said strip comprising a backing strip of release paper, an overlying strip of transparent film having a coating of pressure-sensitive adhesive on its under surface mounted on said backing strip and cut transversely to define 10 individually separable tabs, said tabs being color coded by reverse printing the same first digit on each with ink of the same color and leaving a blank space on each tab directly adjacent said first digit, and said overlying strip having a write-on upper surface coterminous with said blank spaces to enable selective application in each said blank space during use of any desired digit for display with the adjacent said first digit.

5. A set of strips of tabs according to claim 4, wherein only five colors are employed, the first five of said strips respectively displaying 0 through 4 as said first digit, each said strip in a different said color, and the second five of said strips respectively displaying 5 through 9 as said first digit, each said strip in a different said color, with said printing of said second five strips being extended laterally of said tabs to outline said blank spaces.

*6. A strip of 10 two-digit color coded numerical indexing tabs, comprising a backing strip of release paper, an overlying strip of transparent film having a coating of pressure-sensitive adhesive on its under surface mounted on said backing strip and cut transversely to define ten individually separable tabs, said tabs having the same first digit printed on each and leaving a blank space on each tab directly adjacent said first digit, said tabs being color coded by providing an identifying color portion on each of the same color, and said overlying strip having a write-on upper surface coterminous with said blank spaces to enable selective application in each said blank space during use of any desired digit for display with the adjacent said first digit.*

*7. A strip of tabs according to claim 6, wherein the longitudinal margins of said overlying strip comprise skirt portions on each said tab applicable in use to opposed surfaces of a sheet to be indexed, means defining a fold line laterally across each said tab to facilitate such mounting thereof, and said color identifying portion extending on both sides of said fold line to enable three dimensional identification of said tabs as mounted in use.*

*8. A set of ten strips of 10 two-digit color coded numerical indexing tabs with different said strips coded with different colors, each said strip comprising a backing strip of release paper, an overlying strip of transparent film having a coating of pressure-sensitive adhesive on its under surface mounted on said backing strip and cut transversely to define 10 individually separable tabs, said tabs having the same first digit printed on each and leaving a blank space on each tab directly adjacent said first digit, said tabs being color coded by providing an identifying color portion on each of the same color, and said overlying strip having a write-on upper surface coterminous with said blank spaces to enable selective application in each said blank space during use of any desired digit for display with the adjacent said first digit.*

* * * * *

UNITED STATES PATENT OFFICE

CERTIFICATE OF CORRECTION

PATENT NO. : Reissue 29422

DATED : October 4, 1977

INVENTOR(S) : Walter F. Cunningham

It is certified that error appears in the above-identified patent and that said Letters Patent are hereby corrected as shown below:

[56] References Cited

Col.1-Line 4: "3,191,767" should read --3,191,967--

Col.2-Line 46: "The" should be --These--

Col.3-Line 40: "89"." should be --"89."--

Line 45: "3". should be --"3."

Line 64: "33". should be --33."

Col.4-Line 58: "sad" should be --said--

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*